US006424910B1

(12) United States Patent
Ohler et al.

(10) Patent No.: US 6,424,910 B1
(45) Date of Patent: Jul. 23, 2002

(54) METHOD AND SYSTEM FOR PROVIDING RELATED NAVIGATION FEATURES FOR TWO OR MORE END USERS

(75) Inventors: Jean K. Ohler, Bloomingdale; Richard Robinson, Lindenhurst; Brian Walton, Oak Park, all of IL (US)

(73) Assignee: Navigation Technologies Corp., Chicago, IL (US)

(*) Notice: Subject to any disclaimer, the term of this patent is extended or adjusted under 35 U.S.C. 154(b) by 0 days.

(21) Appl. No.: 09/718,751

(22) Filed: Nov. 22, 2000

(51) Int. Cl.⁷ .......................... G01C 21/28; G01C 21/30
(52) U.S. Cl. ...................... 701/202; 701/201; 701/207; 701/208; 701/209; 701/211; 340/988; 342/357.13; 342/357.17
(58) Field of Search ................................. 701/201, 202, 701/203, 207, 208, 209, 213, 211, 214, 217, 300; 340/988, 995; 342/357.06, 357.1, 357.17, 357.09, 357.13

(56) References Cited

U.S. PATENT DOCUMENTS

| | | | |
|---|---|---|---|
| 5,523,950 A | 6/1996 | Peterson | |
| 6,081,609 A | 6/2000 | Narioka | 382/113 |
| 6,141,609 A | 10/2000 | Herdeg et al. | 701/35 |
| 6,148,090 A | 11/2000 | Narioka | 382/113 |
| 6,199,010 B1 | 3/2001 | Richton | 701/206 |
| 6,266,615 B1 * | 7/2001 | Jin | 701/213 |
| 6,324,476 B1 | 11/2001 | Trovata | |

* cited by examiner

Primary Examiner—Gertrude Arthur
(74) Attorney, Agent, or Firm—Frank J. Kozak; Jon D. Shutter (57) ABSTRACT

A feature provided by a navigation system or a navigation services provider provides navigation-related services for plural users who have related needs. In one embodiment, a first user specifies a type of place at which to meet a second user who is at a location some distance away from the first user. The navigation feature identifies one or more places of the specified type that are convenient for both users to travel to. The navigation feature may also provide the users with instructions for traveling to a selected place.

18 Claims, 6 Drawing Sheets

METHOD AND SYSTEM FOR PROVIDING RELATED NAVIGATION FEATURES FOR TWO OR MORE END USERS

REFERENCE TO RELATED APPLICATION

The present application is related to the copending application Ser. No. 09/718,752 entitled "METHOD AND SYSTEM FOR EXCHANGING ROUTING DATA BETWEEN END USERS", filed on even date herewith, the entire disclosure of which is incorporated by reference herein.

BACKGROUND OF THE INVENTION

The present invention relates to computer-based systems that provide navigation features and more particularly the present invention relates to providing navigation features that take into account the related requirements of two or more end users.

Navigation systems are available that provide end users (such as drivers and passengers of the vehicles in which the in-vehicle navigation systems are installed) with various navigation-related functions and features. For example, some navigation systems are able to determine an optimum route to travel by roads between locations in a geographic region. Using input from the end user, and optionally from equipment that can determine one's physical location (such as a GPS system), a navigation system can examine various routes between two locations to determine an optimum route to travel from a starting location to a destination location in a geographic region. The navigation system may then provide the end user with information about the optimum route in the form of guidance that identifies the driving maneuvers required to be taken by the end user to travel from the starting location to the destination location. The guidance may take the form of visual and/or audio instructions that are provided along the way as the end user is traveling the route. Some navigation systems are able to show detailed maps on computer displays outlining routes to destinations, the types of maneuvers to be taken at various locations along the routes, locations of certain types of features, and so on.

In order to provide these and other navigating functions, navigation systems use geographic data. The geographic data may be in the form of one or more databases that include data that represent physical features in a geographic region. The geographic database may include data representing the roads and intersections in a geographic region and also may include information relating to the represented roads and intersections in the geographic region, such as turn restrictions at intersections, speed limits along the roads, street names of the various roads, address ranges along the roads, and so on.

Although navigation systems provide many important features, there continues to be room for new features or other improvements. One area in which there is room for improvement relates to providing navigation services for the related needs of different end users. As an example, if two persons located some distance apart want to make plans to meet for lunch, it would be desirable to use a navigation system (or navigation service) to help these persons select a restaurant that can be reached in approximately the same amount of driving time by each person, taking into account the speed limits on the roads between them and possibly the traffic conditions on the roads between them. Further, it may be desirable to use a navigation system (or navigation service) to provide several different choices of restaurants, all of which are approximately the same driving time for each person. Still further, it may be desirable to use a navigation system (or navigation service) to allow for different departure times, if necessary. Further yet, it may be desirable to use a navigation system (or navigation service) to provide each party with routing guidance to reach the chosen common destination.

These considerations are not limited to finding restaurants, but can be applied to any kind of place, such as shops, golf courses, tennis courts, playgrounds, movie theaters, and so on.

SUMMARY OF THE INVENTION

To address these and other objectives, the present invention comprises a feature provided by a navigation system or a navigation services provider whereby navigation-related services are provided for plural users who have related needs. In one embodiment, a first user specifies a type of place at which to meet a second user who is at a location some distance away from the first user. The navigation feature identifies one or more places of the specified type that are convenient for both users to travel to. The navigation feature may also provide the users with instructions for traveling to a selected place.

DETAILED DESCRIPTION OF THE PRESENTLY PREFERRED EMBODIMENTS

I. Embodiment with Navigation Services Provider

Figure 1:
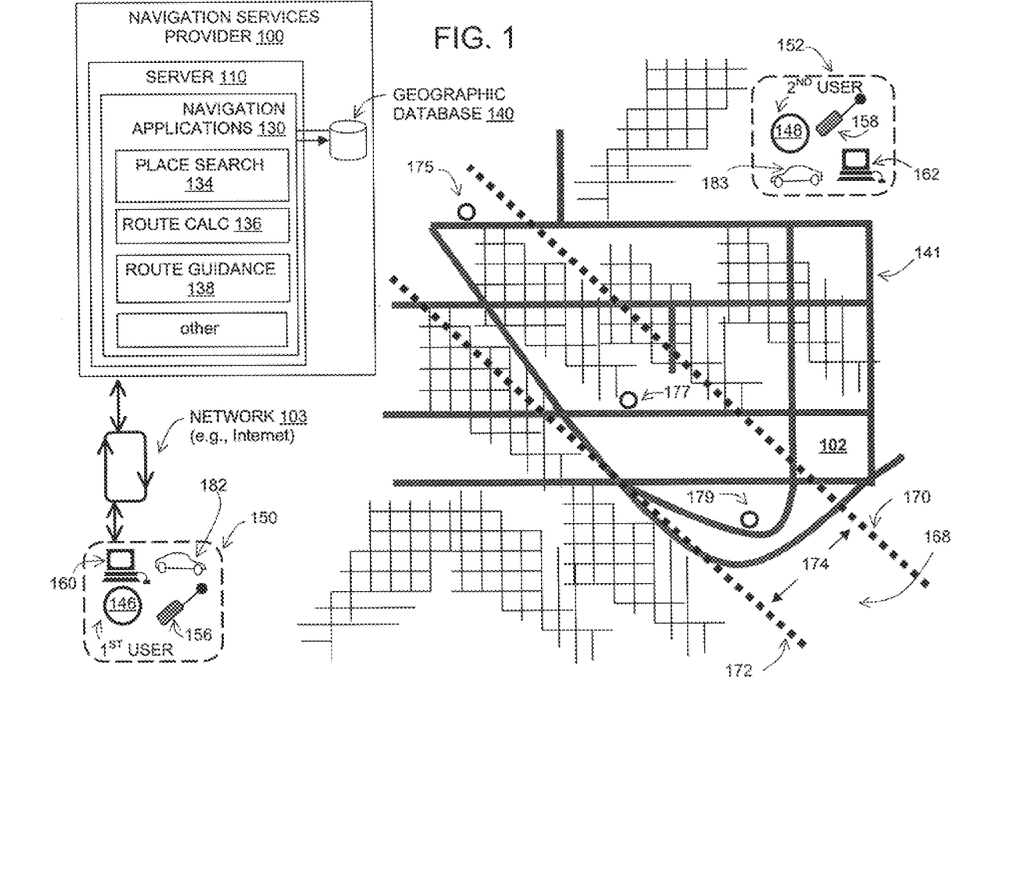
FIG. 1 is an illustration used to describe a first embodiment.

FIG. 1 is an illustration used to describe a first embodiment. According to this embodiment, a navigation services provider 100 provides navigation-related services for users located in a geographic area 102. The geographic area 102 may correspond to a metropolitan area, a city, county, state, country or any combinations of these. The navigation services provider 100 may be located in the geographic area 102 or the navigation services provided 100 may be located outside the geographic area 102.

Users located in the geographic area 102 are able to communicate with the navigation services provider 100 in order to obtain navigation-related services. According to one embodiment, the navigation services provider 100 is accessible over a network 103, such as the Internet. Alternatively, the navigation services provider 100 may be accessible over any communications medium, network, or on-line medium, including the telephone system (wireless and/or land-based), WAP, cellular, radio, satellite, cable, and so on. The navigation services provider 100 may be accessed by exchanging data (e.g., over the Internet), by voice (e.g., with a human operator or using speech recognition software), by telephone keypad input, or other means.

The navigation services provider 100 includes computer equipment, such as a server 110, that allows it to receive requests for navigation services from users located in the area 102 and then respond to the requests. The navigation services provider 100 also includes software applications 130 that are used to provide navigation-related features and functions. Included among the software applications 130 is a place search application 134. In addition, the navigation services provider 100 may include a route calculation application 136 and a route guidance application 138. The navigation services provider 100 may also include other applications.

In order to provide navigation-related services, the navigation applications 130 use data in a geographic database 140. The geographic database 140 may be associated with the server 110 or alternatively, the data in the geographic database 140 may be made available to the navigation services provider server 110 from a remote location. The geographic database 140 includes data about the roads and intersections that form the road network 141 in the geographic area 102. The road network 141 includes the roads and intersections located in the geographic area 102. The data contained in the geographic database 140 includes information about the roads and intersections, such as the speed limits (or speed limit ranges) associated with the roads, traffic signals, turn restrictions, one-way streets, road types (e.g., expressway, toll way, side street, etc.), street names, address ranges, and so on. In addition, the geographic database 140 includes data about points of interest located in the geographic area 102. This includes information about restaurants, municipal buildings (e.g., city halls, police stations, etc.), sports stadiums, movie theaters, auto dealers, gas stations, automatic tellers, and so on. The information about each point of interest includes its location and telephone number, and possibly other information, such as hours of operation. If the point of interest is a restaurant, the information may include a description of an ethnic type, e.g., Chinese, Italian, etc.

The place search application 134 uses the data in the geographic database 140 to identify points of interest based upon search criteria. The search criteria may include spatial criteria, point of interest type, as well as other attributes. As an example, the place search application 134 may be used to identify all the restaurants of a given type (e.g., Chinese) within a 5-mile radius of a given location. Alternatively, the place search application 134 may be used to provide an output indicating the closest automobile dealer of a given manufacturer type (e.g., BMW). Additional functions of the place search application are described below.

The route calculation application 136 uses the data in the geographic database 140 to determine a route to travel along the road network 141 between two locations (i.e., an origin and a destination). The route determined by the route calculation application 136 preferably complies with known traffic restrictions. The route may also be optimized for least travel time, least distance, or some other criteria. The output of the route calculation application 136 may be in the form of a list of road segments that form the route between the origin and destination.

The route guidance application 138 uses the output of the route calculation application 136 to provide instructions for following the route calculated by the route calculation application 136. The instructions may take the form of guidance for making driving maneuvers along the calculated route.

Referring to FIG. 1, a first user 146 and a second user 148 are located in the geographic area 102. The two users 146 and 148 are at different locations in the geographic area 102. The first user 146 is at a location 150 and the second user 148 is at a location 152. These two locations 150 and 152 are some distance apart across the geographic area 102. For example, the distance may be greater than two miles, ten miles, 20 miles, 100 miles, etc. The distance may be less than two miles.

The two users 146 and 148 have a means to communicate with each other. The first user 146 and the second user 148 may use any means to communicate with each other. In one embodiment, the first user 146 and the second user 148 communicate with each other by telephone, e.g., 156 and 158. Alternatively, the first user 146 and the second user 148 communicate with each other by email, e.g., using computers 160 and 162. According to another alternative, the first user 146 and the second user 148 communicate with each other using instant messaging or chat.

Operation

EXAMPLE 1

The two users 146 and 148 want to meet at a common location. For example, the users 146 and 148 may wish to meet for lunch. The users 146 and 148 want to meet at a location that is convenient for both of them to travel to. The navigation services provider 100 includes a feature that can be used for this purpose.

Figure 2:
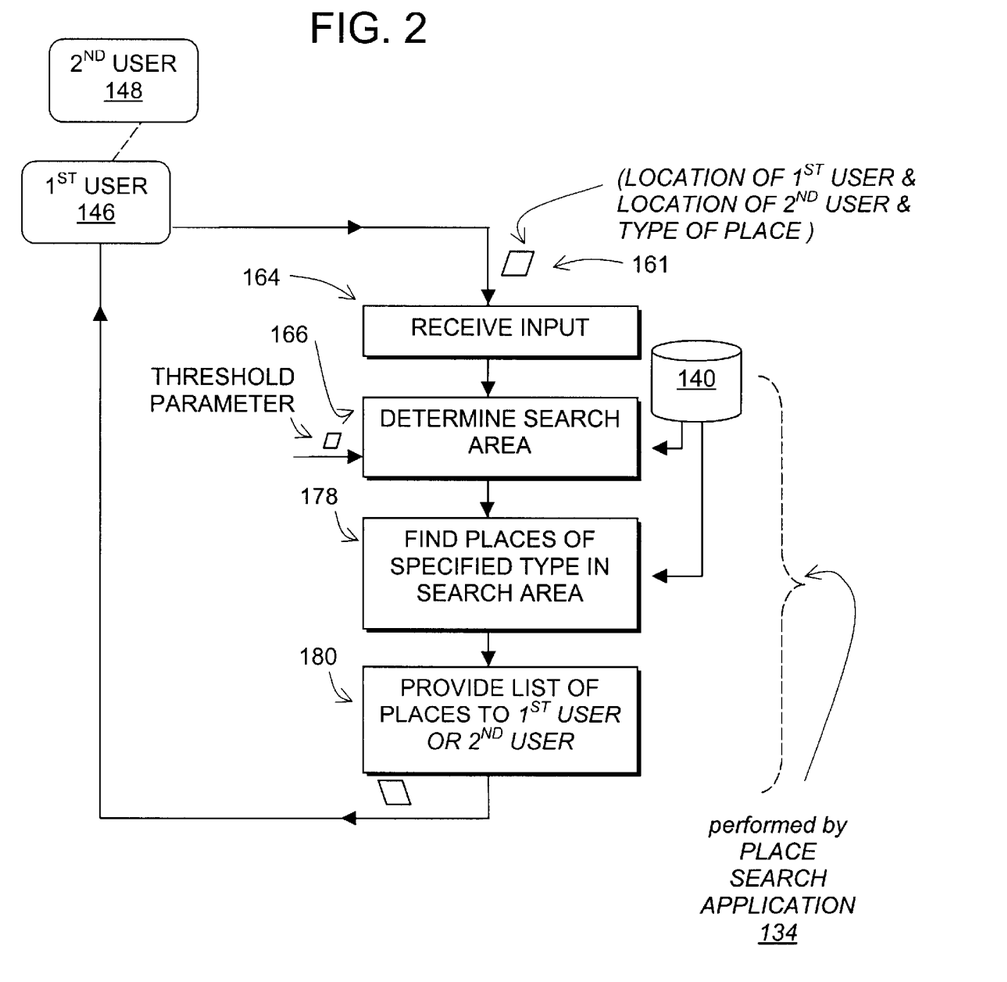
FIG. 2 is a flowchart showing the steps performed by the navigation services provider in FIG. 1.

According to this feature, one of the users 146 (or both of the users 146 and 148) communicates with the navigation services provider 100. The user 146 accesses the navigation services provider 100 via the network 103 or any other means of communication. The user 146 requests the navigation services provider for a list of one or more places at which it would be convenient for both users to meet. The place search application 134 on the server 110 of the navigation services provider 100 may be used for providing this function. The steps performed by the navigation service provider 100 are shown in FIG. 2.

In one embodiment, the user 146 provides the navigation services provider 100 with data 161 identifying the location of the first user, the location of the second user and the type of point of interest at which the two users want to meet. This information is received by the navigation services provider (Step 164).

According to one embodiment, a place that is equally convenient for both users would be a place that is approximately equidistant from both users. In one embodiment, the navigation services provider 100 searches for places of the indicated type that are approximately equidistant from the locations of the two users. In order to find places of the indicated type that are approximately equidistant from both users, the place search application 134 determines a search area (Step 166).

An example of a search area 168 is shown in FIG. 1. As shown in FIG. 1, the search area 168 is a band-shaped area approximately equidistant from the locations 150 and 152 of both users. When determining the search area 168, the place search application 134 defines two search area boundaries 170 and 172. The search area boundaries 170 and 172 are lines that are each perpendicular to a line directly connecting the locations 150 and 152 of the first user 146 and the second user 148, respectively. The boundaries 170 and 172 are separated by a distance 174 (i.e., the search area width). The distance 174 may be determined by a threshold parameter. As an example, if a threshold parameter of 10% is used and the two users are 20 miles apart, the distance 174 between the boundaries 170 and 172 of the search area 168 is 2 miles, and therefore, the search area 168 is a band 2-miles wide that extends perpendicularly to a line extending directly between the locations of the two users.

The threshold parameter is preferably configurable to take into account the distance between the locations of the two users. For example, a minimum distance and a maximum distance between the boundaries 170 and 172 of the search area may be established. A minimum distance (e.g., 1 mile) between the search area boundaries may be established so that the search area width 174 does not become too narrow. Likewise, a maximum distance between the boundaries 170 and 172 may be established so that the search area width 174 (and therefore the size of the search area 168) does not become too large.

The dimension of the search area 168 in the direction parallel to the boundaries 170 and 172 is limited so that places that are far away from the locations of the users are not selected. Also, the search area dimension in the direction parallel to the boundaries may be limited so that the size of the search area 168 does not become too large.

After the search area 168 is determined, the navigation services provider 100 searches for places of the type specified by the user that are located within the defined search area 168. Using the geographic database 140, the place search application 134 finds all the places (labeled 175, 177, and 179 in FIG. 1) of the type specified by the user that are located within the search area 168 (Step 178 in FIG. 2). The navigation services provider 100 provides data indicating this list of one or more places to the user(s) (Step 180). In one embodiment, the data provided to the user(s) identify each place on the list (e.g., by name) and its location.

There are various ways that the data may be provided, depending upon how the information was requested from the navigation services provider 100. If the user requested the information using a browser, the data indicating the places may be provided back to the user in a window of the browser. Alternatively, the information indicating the one or places may be printed out. According to another alternative, the data indicating the conveniently located places may be provided in a format that is downloadable into a PDA (personal digital assistant) of the user. If the user was using a phone to request the information about conveniently located places, the information may be provided audibly.

If the place search application 134 does not find any places of the specified type located in the search area 168, the size of the search area may be expanded. If the place search application 134 still cannot find any places of the specified type located in the search area 168, the user is informed that the search was unsuccessful. The place search application 134 may suggest an alternative type of place. For example, if the user specified a Thai restaurant and there were no Thai restaurants located within the search area, the place search application may suggest a Chinese restaurant, a Vietnamese restaurant, a Korean restaurant, and so on.

The user who receives the list of one or more places that are convenient for both users to travel to may choose one of the places as the place at which to meet the other user. The users may consult with each other in order to make this decision. The users may rule out one or more of the identified places for various reasons, such as the restaurant is too expensive, parking is difficult, unsafe neighborhood, etc.

In the embodiment described above, it is assumed that the users would drive to the meeting place using their respective vehicles, 182 and 183, and that the users' vehicles 182 and 183 were at the locations 150 and 152 of the respective users 146 and 148. Accordingly, when the locations of the first and second users 146 and 148 are provided to the navigation services provider 100, it is assumed that a place that is convenient to both users would be a place convenient for them to drive to starting from their respective locations. In an alternative embodiment, either of both of the users' vehicles may be at a location which is different from the location of the user. If a user's vehicle is not at the same location as the user, the location of the user's vehicle may be specified to the navigation services provider 100 when requesting identification of one or more places of a specified type that are located conveniently for both users.

Operation

EXAMPLE 2

In the embodiment of FIG. 2, the place search application 134 determined a search area in which to search for places of the specified type. In the embodiment of FIG. 2, the boundaries of the search area were determined so that places located in the search area were approximately equidistant from both users. Although the method described in FIG. 2 is satisfactory for many types of searches, an alternative embodiment for determining conveniently located places of a specified type is described in connection with the flow chart in FIG. 3. The method described in FIG. 3 may be performed by the place search application 134 in FIG. 1.

Figure 3:
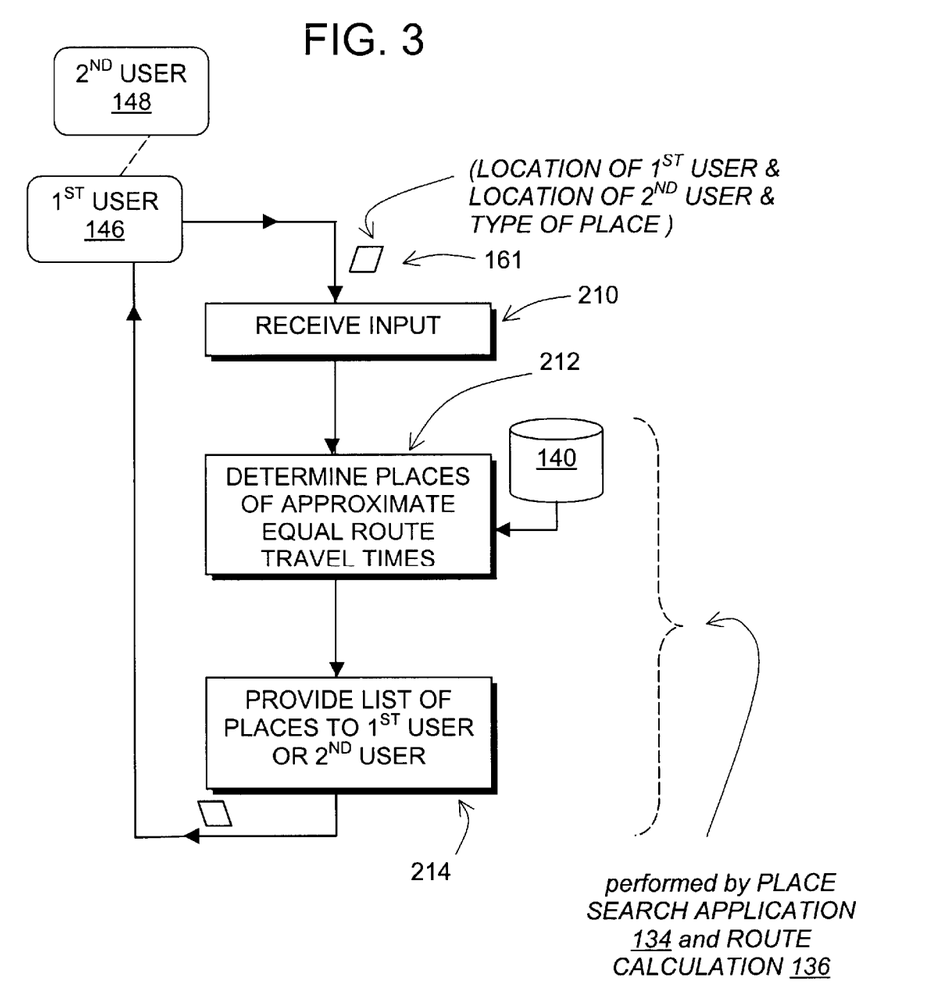
FIG. 3 is a flowchart showing a process performed by the navigation services provider during an alternative embodiment.

The method described in FIG. 3 calculates the driving times for each of the users when determining places that are equally convenient for both of them to travel to. The embodiment of FIG. 3 provides an advantage in a scenario in which one of the users is close to an expressway (or other high speed road) and the other user is relatively far from an expressway. In this scenario, the user that is close to an expressway can travel further in the same amount of time compared to the other user. Thus, the places at which it would be convenient for the two users to meet would tend to be closer to the user who is relatively further away from high speed roads.

In the process of FIG. 3, the navigation services provider 100 receives data indicating the locations of the first user, the second user, and the type of point of interest at which the users would like to meet (Step 210). Using the geographic database 140, the place search application 134 finds one or more places of the specified type that take approximately the same driving time for both users to reach (Step 212).

The place search application 134 may find these places in several ways. According to one method, the place search application 134 may define a search area, as in the embodiment described in FIG. 2, and then calculate routes from the locations of both users to the places of the specified type that are located in the search area. The place search application 134 may call the route calculation application (136 in FIG. 1) to perform this function. The route calculation application 136 uses data from the geographic database 140 when performing this function. The route calculation application 136 may use real-time traffic information that takes into account any traffic jams, construction delays, etc. When the route calculation application 136 calculates routes from the locations of the users, it determines the routes that have the fastest travel times to each identified place of the specified type. After routes to each identified place of the specified type are calculated, the place search application 134 compares the travel times of these routes to each identified place of the specified type. The place search application 134 identifies those places for which the routes from the locations of the two users have approximately equal travel times. The place search application 134 forms a list of one or more places of the specified type and provides data indicating this list to one or both users (Step 214). When providing information to the users about conveniently located places, the place search application may indicate the approximate travel times (for each user) associated with each place on the list. As in the previously described embodiment, the information may be provided to the user(s) in various formats, e.g., in a browser, a print out, downloaded into a PDA, etc.

In this embodiment, if the place search application 134 defines a search area in order to identify locations for which to calculate routes from the users' locations, a search area of a relatively large size may be used in order to increase the likelihood of finding most or all the places of the specified type that have approximately equal route travel times.

The following is another way that the place search application 134 can use to find one or more places of the specified type that take approximately the same driving time for both users to reach. First, using the route calculation application 136, a route between the two users is determined and an approximate driving time of the route is determined. Then, all the places of the specified type are identified that are within a threshold (e.g., 20%) of half the driving time from each of the users. Then, all the places of the specified type that are in common would be identified as conveniently located places. As an example, if a route between the two users takes about 60 minutes, all the places of the specified type that are within 36 minutes driving time (120%*60 minutes*½) of each user are identified. Those places that are in common for both users form the list of conveniently located places.

Operation

EXAMPLE 3

In the previous examples, the two users wanted to find a place of a specified type at which to meet that would be convenient for both of them to travel to. According to an alternative embodiment, the two users may want to include one or more additional restrictions on the selection of a meeting place. For example, the two users may wish to meet in a particular city, suburb, or neighborhood. Using the systems described above, the users can include additional restrictions when requesting the navigation services provider to find places of a specified type at which it would be convenient for the two users to meet. As an example, the users can request the navigation services provider to find a restaurant that is convenient to both users (based on travel times) and which is located in a specified neighborhood.

Operation

EXAMPLE 4

In the above embodiments, the navigation services provider identifies places of a specified type that are convenient for two users to travel to. According to another embodiment, the navigation services provider can provide one or both users with route guidance for traveling to the selected place. This embodiment is described in connection with FIG. 4.

Figure 4:
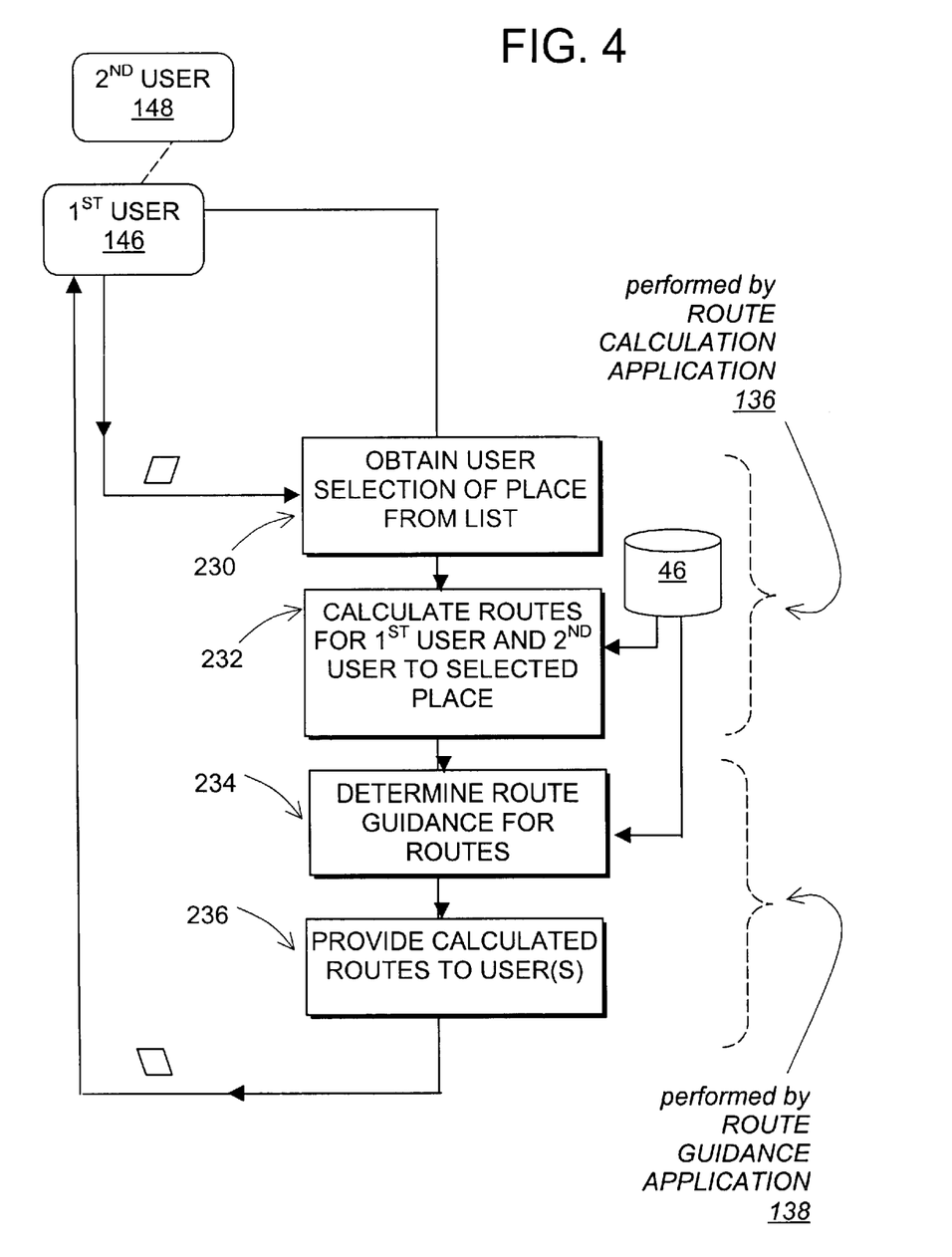
FIG. 4 is a flowchart showing another process performed by the navigation services provider according to an alternative embodiment.

In FIG. 4, one user or both users selects one of the places identified by the navigation services provider 100 as being conveniently located for both users. This selection is received by the navigation services provider (Step 230 in FIG. 4). The navigation services provider 100 calculates routes for both users to the selected destination (Step 232 in FIG. 4). The navigation services provider 100 uses the route calculation application (136 in FIG. 1) for this purpose. (These routes may have already been calculated if the alternative described in Example 2 was used to determine places of the specified type that were conveniently located to both users.)

After routes for both users to the selected destination are calculated, route guidance is determined for both routes (Step 234 in FIG. 4). The route guidance may comprise instructions for driving the calculated routes. The route guidance is determined by the route guidance application (138 in FIG. 1).

After the route guidance is determined, data indicating the route guidance are provided to one or both users (Step 236 in FIG. 4). The data indicating the route guidance may be provided by any of the means previously described.

II. Embodiment with Navigation Services Provider and User Navigation Systems

Figure 5:
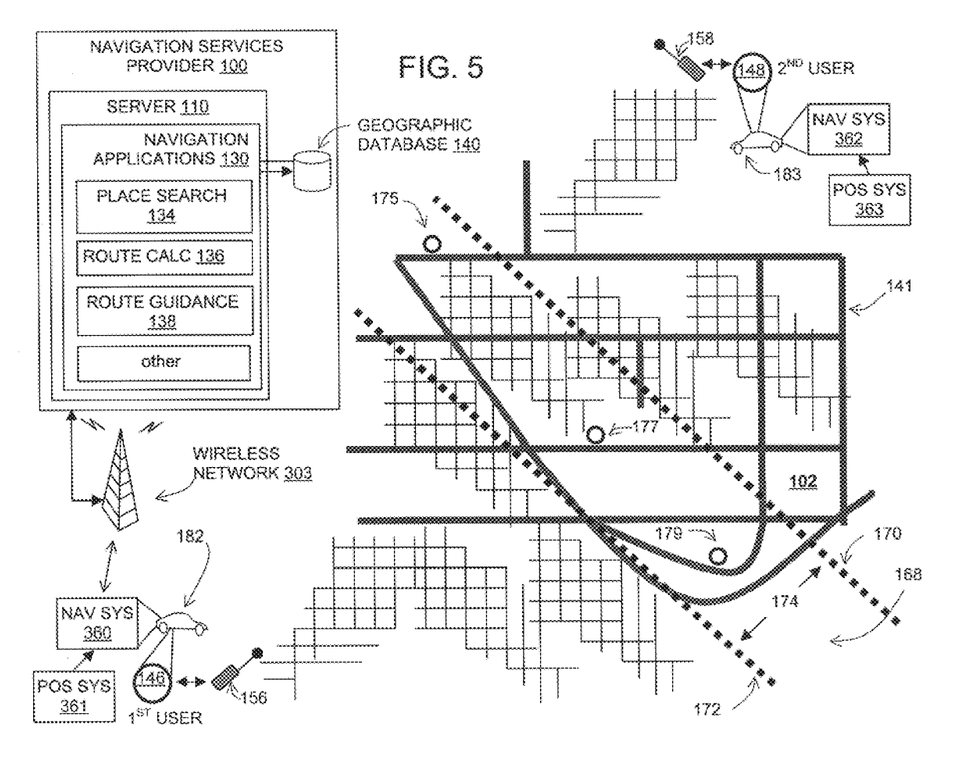
FIG. 5 is an illustration used to describe another embodiment.

FIG. 5 is an illustration used to describe another embodiment. This embodiment includes components that are similar to those described in connection with FIG. 1 and like components are identified by identical numbers.

According to this embodiment, either or both users 146 and 148 have navigation systems 360 and 362, respectively. Either or both navigation systems 360 and 362 may be in-vehicle navigation systems (i.e., systems installed in the respective vehicles, 182 and 183, of the users 146 and 148). Alternatively, either or both navigation systems 360 and 362 may be portable systems (i.e., systems that are removable from the respective vehicles 182 and 183). According to another alternative, either or both navigation systems 360 and 362 may be implemented with navigation programming installed on a general-purpose device, such as personal computer or a PDA. As an example, either or both navigation systems may be implemented using programming installed on a PalmPilot®-type device.

Either or both navigation systems may include or be associated with positioning systems. In FIG. 5, the navigation system 360 is associated with positioning system 361 and the navigation system 362 is associated with positioning system 363. Each positioning system 362 or 363 includes hardware and software that enables the position of the respective navigation system to be determined. Each positioning system may use or incorporate technologies, such as a GPS, dead-reckoning, or combinations of these or other technologies.

In the embodiment of FIG. 5, the users 146 and 148 obtain navigation-related services from the navigation services provider 100. The navigation services provider 100 in FIG. 5 provides the same or similar types of services previously described in connection with FIGS. 1–4. In addition, the navigation services provider 100 operates in conjunction with the navigation systems 360 and 362 to provide additional types of navigation-related services.

In order to operate together, the navigation systems 360 and 362 and the navigation services provider 100 include suitable hardware and software for exchanging data. In addition, the navigation systems 360 and 362 and the navigation services provider 100 use a communications system 303 over which data are exchanged. Because the navigation systems 360 and 362 may be installed in vehicles or are otherwise portable, at least part of the communications system 303 is a wireless system.

According to one embodiment, the navigation services provider 100 operates in conjunction with the navigation systems 360 and 362 to provide route calculation and guidance to the users 146 and 148, respectively. Using data indicating the position of the user's navigation system (obtained using the positioning system associated therewith), the navigation services provider 100 can provide the user with information about places of a specified type located around the user. The navigation services provider can provide the user with guidance for following a route to a desired destination. Using data indicating the position of the navigation system, the navigation services provider can provide the guidance at appropriate locations as the user is traveling along the calculated route to the desired destination.

Like the embodiment of FIG. 1, the embodiment of FIG. 5 can be used to provide navigation-related features that take the related navigation needs of separate users into account. The users 146 and 148 can use the embodiment of FIG. 5 to find a meeting place that is convenient for both users to reach.

Operation

EXAMPLE 5

As in the previous examples, the two users 146 and 148 want to meet at a common location. According to this embodiment, one of the users 146 (or both of the users 146 and 148) uses his/her navigation system to communicate with the navigation services provider 100 via the network 303. The position of the user 146 who communicates with the navigation services provider 100 can be determined by the positioning system 361 associated with the user's navigation system 360. The user 146 provides the navigation services provider 100 with information that identifies the other user 148. This information may be a user ID, a name, etc. (Alternatively, the user 146 may provide the navigation services provider 100 with data identifying the location of the other user 148.) The first user 146 also provides the navigation services provider 100 with data identifying the type of point of interest at which the two users want to meet. The first user 146 requests the navigation services provider for a list of one or more places at which it would be convenient for both users to meet.

If the first user 146 provided the navigation services provider 100 with information that identified the second user, the navigation services provider 100 may query the navigation system 362 of the second user 148 to obtain the position of the second user as determined by the positioning system 363 in the second user's navigation system 362.

After the navigation services provider has data that indicate the locations of the first user and the second user and the type of place at which the users would like to meet, the navigation services provider determines places at which it would be convenient for the users to meet. The process used by the navigation services provider 100 to provide this function can be similar to any of the processes described above in connection with FIGS. 1–4.

As in the prior embodiment, the navigation services provider provides one or both users with a list of one or more places of the specified type at which it would be convenient for both users to meet. In the embodiment of FIG. 5, the navigation services provider can provide routing guidance to both users (via their navigation systems 360 and 362) for traveling to the place that is selected.

III. Embodiment with User Navigation Systems

Figure 6:
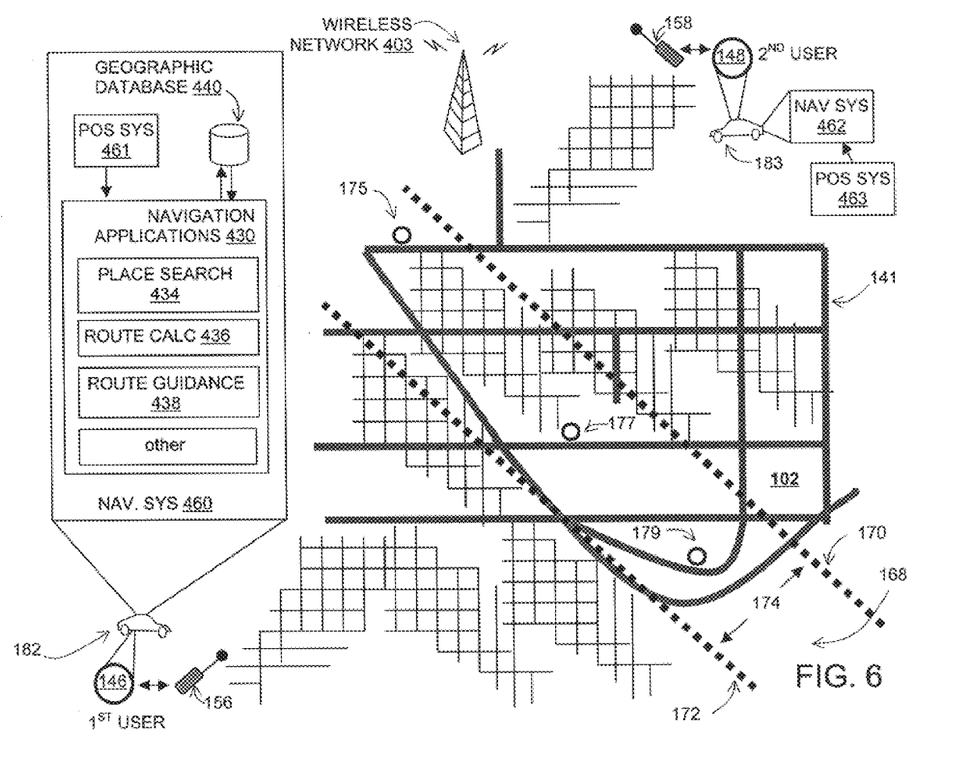
FIG. 6 is an illustration used to describe yet another embodiment.

FIG. 6 is an illustration used to describe another embodiment. This embodiment includes components that are similar to those described in connection with FIGS. 1 and 5 and like components are identified by identical numbers.

In the embodiment of FIG. 6, the first user 146 has a first navigation system 460. The first navigation system 460 may be an in-vehicle navigation system (i.e., a system installed in the vehicle 182 of the first user 146). Alternatively, the navigation system 460 may be a portable system (i.e., a system that is removable from the vehicle 182). The navigation system 460 may be implemented with navigation programming installed on a general-purpose device, such as personal computer or a PDA. The first navigation system 460 is associated with a first positioning system 461 that is used to determine the location of the first navigation system 460.

The navigation system 460 includes hardware and software that enables it to provide navigation-related services to the user 146. The first navigation system 460 includes or is associated with a first positioning system 461 that is used to determine the location of the first navigation system 460. The first navigation system 460 also includes navigation programming 430 which may be similar or identical to the navigation programming 130 installed on the server 110 of the navigation services provider 100 in FIG. 1. The navigation programming 430 includes a place search application 434, a route calculation application 436 and a route guidance application 438. The navigation programming 430 installed in the navigation system 460 may include other programs and applications. The navigation applications 430 use data contained in a geographic database 440. The geographic database 440 may be similar to the database 130 described above. The geographic database 440 may be installed with the navigation system 460 or alternatively, the geographic database 440 may be located remotely and the data in the geographic database made available to the navigation system 460 over a communications system.

Because the navigation system 460 in the embodiment in FIG. 6 includes the hardware and software for providing navigation-related services to the user 146, the user 146 obtains these services from his/her local navigation system 460 instead of obtaining these services from a remotely located navigation services provider, as in the embodiments of FIGS. 1 and 5. For this reason, a navigation services provider is not shown in FIG. 6. Although the navigation system 460 in FIG. 6 includes the hardware and software needed to provide navigation services to the user 146, the embodiment of FIG. 6 does not preclude use of a remotely located navigation services provider. According to alternative embodiments, navigation services can be provided to a user by a hybrid system that combines both a local navigation system (with programming and possibly a geographic database) and a remotely located navigation services provider.

The second user 148 has a second navigation system 462 that has or is associated with a second positioning system 463 that is used to determine the location of the second navigation system 462. The second navigation system 462 may be similar or identical to the first navigation system 460

Operation

EXAMPLE 6

Because some or all navigation-related services are provided to the user 146 by the local navigation system 460, the embodiment of FIG. 6 implements the place search functions locally on the first navigation system 460. These functions are implemented in a similar manner as in the embodiments described above in which the place search functions were provided by the remotely located navigation services provider.

In order to use the place search functions on the local navigation system 460, the users first decide on a type of place at which to meet, as in the previous embodiments. The users may use their wireless phones 116 and 118 while they are in their automobiles 182 and 183. After the users decide on a type of place, one of the users (e.g., the user 146) uses the place search functions on his/her navigation system 460 to find a convenient place for both users to meet. The user 146 selects the place search function and specifies a type of place. The place search application 434 in the navigation system 460 may use the positioning system 461 associated with the navigation system 460 to obtain the current location of the user 146. The user 146 enters information into the navigation system 460 indicating the location of the other user 148. There are various means by which the location of the other user can be indicated to the first user's navigation system 460. For example, the first user can indicate the second user's approximate location (e.g., street address) which the second user 148 can provide to the first user over the phones 116 and 118. Alternatively, the first user can indicate the second user's approximate location by selecting a point on a map shown on the display of the first user's navigation system 460. According to another alternative, the first user 146 can request his/her navigation system 460 to initiate communications with the second user's navigation system 462 which uses the positioning system 462 associated therewith to provide the first navigation system 460 with data indicating the location of the second user.

After the place search application 434 in the first user's navigation system 460 has a specification of the type of place at which the users want to meet and data indicating the locations of the users, the place search application identifies one or more place of the specified type that would be convenient for both users to travel to. The place search application 434 in the first user's navigation system 460 may identify these places using any of the methods described above.

The first user's navigation system provides the list of one or more locations of the specified type to the first user. (Optionally, the first user's navigation system 460 may provide the list of one or more locations of the specified type to the second user via a communications link with the second user's navigation system 462, if available.)

The users select one of the places on the list provided by the first navigation system 460.

According to an alternative embodiment, the first user's navigation system 460 may provide route guidance for the first user to travel to the selected destination. The first user's navigation system 460 uses the route calculation application 436 and the route guidance application 438 in the first user's navigation system for this purpose.

The second user may receive route guidance for traveling to the selected destination. One way that the second user can receive guidance for traveling to the selected destination is to have the second user use his/her own to calculate a new route to the destination starting from the second user's current position.

According to another alternative embodiment, the first user's navigation system calculates a route to the selected destination for both the first user and the second user. A consideration related to this alternative is that determination of a convenient meeting place for both persons (i.e., taking into account the locations of both persons) is performed on the first user's navigation system, but guidance for traveling to the selected meeting place is provided by both the first user's navigation system (for the first user) and the second user's navigation system (for the second user). Accordingly, there is a need for the navigation system that determines the convenient meeting place (i.e., the first user's navigation system) to transmit data that define the route to the other navigation system (the navigation system of the second user) to provide guidance for one second user to reach the selected destination. The copending application Ser. No. 09/718,752 entitled "METHOD AND SYSTEM FOR EXCHANGING ROUTING DATA BETWEEN END USERS", discloses methods and systems that can be used by the present alternative embodiment to distribute the routing data from one navigation system to another.

According to this alternative embodiment, after the place for the two persons to meet is determined using the first user's navigation system, data that identify the route for the second person to travel to reach the selected destination are transmitted to the second person's navigation system from the first person's navigation system. When the second person's navigation system receives the data that define a route, the data are used by the second person's navigation system to provide guidance for following the route. According to one alternative embodiment, the route for the second user to follow is defined using ID's of the data records that represent the road segments that define the route for the second person. These ID's are stored in a data file that is transmitted from the first person's navigation system to the second person's navigation system. The second user's navigation system 462 receives data from the first user's navigation system 460 that indicates the route for the second user to travel and provides route guidance to the second user, as appropriate. Instead of using ID's, the road segments that form the route for the second person to follow can be identified by their geographical coordinates (e.g., latitude and longitude). Alternatively, the road segments that form the route for the second person to follow can be identified by street name, direction, and distance.

IV. Other Alternative Embodiments

As described in connection with some of the above alternatives, in response to a request from a user that specifies a type of location at which a meeting with another user is desired and that includes data identifying the locations of both users, the user receives a list identifying one or more places that would be convenient for both users to travel to. In any of these embodiments, the user may also be provided with information that indicates the estimated travel times for each user for each of the places on the list. If a selected place has a travel time for one of the users that is less than the travel time for the other user, the user with the shorter travel time can use this travel time information to plan to leave for the selected place at a correspondingly later time.

In the embodiments described above, a user specified a type of location at which a meeting with another user was desired and provided data identifying the locations of both users. In the above embodiments, the user does not necessarily have to specify a time for the meeting with the other user. If the user did not specify a time for the meeting with the other user, the place search application assumes, by default, that the users would both leave for the meeting immediately. According to a further alternative embodiment, a user can specify a desired meeting time when specifying a type of place at which to meet the other user. Then, when a list of one or more places at which it would be convenient to meet is determined, the place search application takes the desired meeting time into account. For example, if the desired meeting time is during rush hour, there may be longer travel times on some roads. The longer travel times would not necessarily affect each user the same. Therefore, taking the desired meeting time into account may change which places are equally convenient for both users.

When a user indicates a desired meeting time when specifying a type of place at which a meeting with the other user is desired, the place search application may indicate recommended departure times for each user for each of the places that are convenient for both user. The place search application may use the route calculation application for this purpose. Alternatively, the place search application may indicate recommended departure times for each user for only the place that is selected. If the desired meeting time is too soon for any of the places on the list of places that are convenient for both users, the place search application includes an indication that the places are all too far away to be reached by the desired meeting time.

In the embodiments described above, the place search application assumes, by default, that both users plan to leave for the desired destination at the same time or approximately the same time. In an alternative embodiment, the users may specify different departure times for each user. If the users indicate different departure times, the place search application uses this information about different departure times when finding a conveniently located place.

In the previously described embodiments, when finding a convenient place for two users to meet, the place search application assumes, by default, that the users are traveling by car. In an alternative embodiment, either or both users may use a means of transportation other than a car or may travel by a combination of different means of transportation, including by car. As an example, other means of transportation include walking, bicycle, public transportation (including buses, trains, and trolleys), taxi, ferry, and so on. As an example, one of the users may have to walk several blocks to his/her car. When requesting a list of convenient places to meet, the user may indicate to the place search application whether some or all of either user's travel will be by a means of transportation other than car, and if so, the specific means of transportation for each portion of travel.

In the above embodiments, it was described how the place search application found places at which it would be convenient for two users to meet. The place search application can perform a similar function for more than two users, e.g., three, four, etc.

In some of the embodiments described above, the users were provided with driving directions for traveling to the select convenient place. According to another alternative, the users are also provided with directions for returning back to their respective starting locations from the selected destination.

According to another alternative, the users may want to find a place to meet first, and then travel together to another location, such as a restaurant, after they meet. The place at which the users may want to meet first may be a public place at which one of the users can leave his/her vehicle. The two users can then proceed in one vehicle to another place, such as a restaurant. Any of the embodiments described above can be used to provide this alternative.

In another alternative embodiment, after a convenient meeting place for the two users is selected and the two users begin traveling toward the selected meeting place, one of the users is provided with status information about the other user's progress toward the meeting place. According to this alternative, as one of the users travels toward the selected meeting place, data that indicate the user's position are sent to the other user. The first user's position is determined using the positioning system in the first user's navigation system (if available) or may be determined using other positioning technology. Data indicating the position of the first user are sent wirelessly to the second user directly or, in embodiments that include a centrally located navigation services provider, the data indicating the position of the user may be transmitted via the navigation services provider. Likewise, data indicating the position of the second user are sent to the first user. Each user uses the data that indicate the position of the other user to track the other user's position on his/her navigation system. In this manner, if one of the users encounters a delay while traveling to the selected meeting place, the other user is immediately notified.

In a similar manner, when one of the users reaches the selected meeting place and the other user is still traveling, the user who is still traveling is notified about the arrival of the first user at the selected meeting place.

It is intended that the foregoing detailed description be regarded as illustrative rather than limiting and that it is understood that the following claims including all equivalents are intended to define the scope of the invention.

We claim:

1. A method of operation for a computer-based system that provides navigation-related services, the method comprising:

receiving a request for navigation-related services, wherein the request is for a common meeting place at which it would be convenient for at least two users to meet, wherein said at least two users are located at different locations;

determining the common meeting place such that travel times for each of said at least two users to said common meeting place are approximately equal; and identifying the common meeting place to at least one of the users.

2. The method of claim 1 wherein the request is received over a network.

3. The method of claim 2 wherein said network comprises the Internet.

4. The method of claim 1 further comprising:

providing instructions to said at least two users to travel to said common meeting place.

5. The method of claim 1 further comprising:

providing instructions with said computer-based system to said one of said at least two users to travel to said common meeting place; and using said computer-based system to transmit data defining a route for the other of said at least two users to travel to the common destination.

6. The method of claim 5 further comprising:

on another computer-based system, using the data defining the route to provide instructions to the other of said at least two users to travel to the common destination.

7. The method of claim 5 further comprising:

on another computer-based system, receiving the data defining the route from the computer-based system; and on the other computer-based system, using the data to provide instructions to the other of said at least two users to travel to the common destination.

8. The method of claim 5 wherein the data defining the route comprise ID's of data records that represent road segments in the route for the other of said at least two users to travel to the common destination.

9. A method of operation for a computer-based system that provides navigation-related services, the method comprising:

receiving a request for a meeting place that is approximately equal driving time for each of two users to reach by car; and providing a list of potential meeting places that are approximately equal driving time for each of said two users to reach by car.

10. The method of claim 9 further comprising:

receiving with said request data that identify locations of each of said two users.

11. The method of claim 9 further comprising:

after providing the list of potential meeting places, accepting a request for a second list having additional meeting places if one of the users does not want to meet at any of the places on the list of potential meeting places.

12. The method of claim 9 wherein the computer-based system is web-based.

13. The method of claim 9 wherein the computer-based system is an in-vehicle navigation system.

14. The method of claim 9 further comprising:

after providing the list of potential meeting places, providing driving instructions for each of the two users to reach one of the meeting places that had been selected from the list by at least one of the users.

15. The method of claim 9 further comprising:

transmitting data that define a route to one of the users; and on a navigation system of the one of the users who received the data that define the route, using the data to provide guidance for the one of the users to follow the route to one of the meeting places that had been selected from the list.

16. The method of claim 15 wherein the data that define a route are transmitted from a navigation system of the other of the users.

17. A system that provides navigation services comprising:

a place search program run on a computer system and that finds one or more places of a specified type at which it would be convenient for two persons starting from different locations to meet such that travel times for each of said two persons to said one or more places of the specified type are approximately equal; and a route calculation program that determines a first route for a first of the two persons to travel from a starting location of the first person to a destination selected from the one or more places of the specified type found by the place search program and a second route for a second of the two persons to travel from a starting location of the second person to the destination.

18. The invention of claim 17 further comprising:

a route guidance program that provides a first set of driving instructions for the first of the two persons to travel the first route and a second set of driving instructions for the second of the two persons to travel the second route.

\* \* \* \* \*